W. E. HARMON.
AUTOMOBILE BODY LOCK.
APPLICATION FILED JULY 11, 1919.
1,361,052. Patented Dec. 7, 1920.
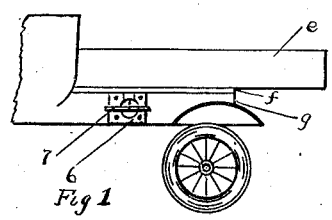
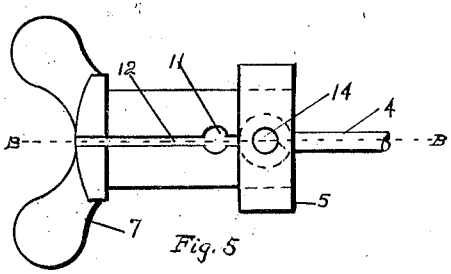
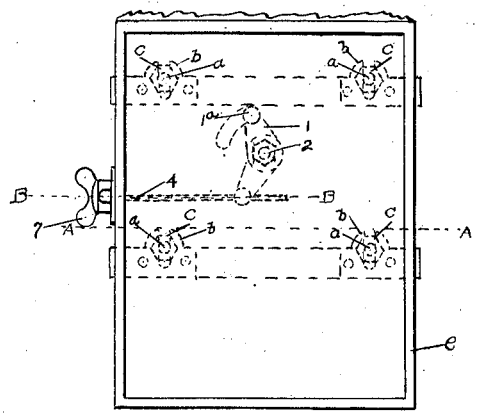
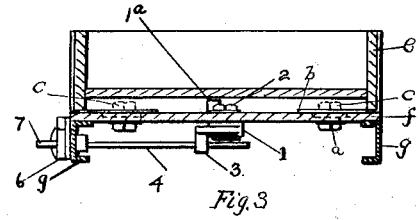
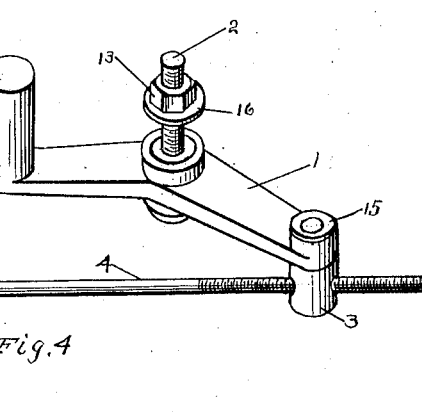
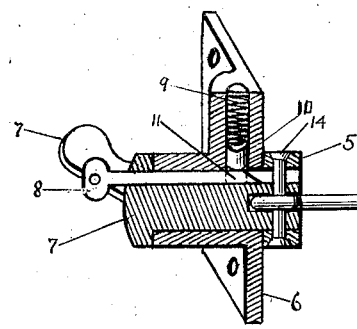
WITNESS:
Millie F. Harmon
Elizabeth R. Harmon
INVENTOR.
Willis E. Harmon

UNITED STATES PATENT OFFICE.

WILLIS E. HARMON, OF WORCESTER, MASSACHUSETTS.

AUTOMOBILE-BODY LOCK.

1,361,052.  Specification of Letters Patent.  Patented Dec. 7, 1920.

Application filed July 11, 1919. Serial No. 310,213.

*To all whom it may concern:*

Be it known that I, WILLIS E. HARMON, a citizen of the United States, residing at Worcester, in the county of Worcester and State of Massachusetts, have invented new and useful Improvements in Automobile-Body Locks, of which the following is a specification.

This invention relates to a lock adapted to control the horizontal movement of a truck or other automobile body so arranged that it becomes wedged to the chassis upon which it is placed when moved in the proper horizontal direction and is particularly adapted to a body of the class shown in Letters Patent No. 1293090, Feb. 4, 1919.

In the accompanying drawing like numbers refer to like parts:

Figure 1 is a side elevation of a small truck body mounted upon an automobile runabout.

Fig. 2 is a plan view showing my automobile body lock in position to hold the body locked to the chassis.

Fig. 3 shows a section view on the line A—A Fig. 2.

Fig. 4 shows all the parts of the automobile body lock partly in section on the line B—B.

Fig. 5 shows the winged head for turning rod #4.

Now referring to the drawings, in which the old parts are indicated by letters and my invention by figures:

Figs. 1–2 and 3 show the usual small truck body mounted upon a runabout. The projecting bolts a—a—a— and a attached to the floor f, which is made fast to the chassis channel irons g—g, are arranged to enter the slotted wedge plates b—b—b and b on the body and wedge it to the chassis when said body is moved forward.

Lever #1, which is pivotally mounted on the under side of the floor f, by means of bolt #2, has a projection #1ª, which passes through the slot in the floor f and is adapted to engage a cross piece of the truck body. A member #3 pivotally mounted on the lever #1 is threaded to receive a screw rod #4.

A plate member #6, shown attached to the side of the chassis in Figs. 1–2 and 3 and in detail in Fig. 4, forms a bearing plate for the winged head #7. This plate member #6 has a channel containing the plunger #10 which is pressed toward the winged head #7 by the spring #9.

The winged head #7 which is adapted to turn the screw rod #4, as shown in detail in Figs. 4 and 5, has a depression or hole #11 drilled on one side adapted to receive the plunger #10 when the winged head is turned so the plunger can enter it. A slot #12 is cut in the winged head #7, through the depression or hole so a wedge pointed key can pass under the plunger #10, to raise it from the depression or hole and unlock it. The collar #5, adapted to hold the winged head in place, is fastened by the rivet #14 which also holds the screw rod #4 in the slot in the winged head #7.

In operation the body is placed on the chassis with the lever #1 in released position, the body is pushed forward until the bolts a—a—a— and a enter the clips b—b—b and b, the key is pushed into the winged head #7 which is turned to the right until the truck body is forced forward and wedged to the chassis. When the depression or hole #11 is under the plunger #10, the key #8, is withdrawn, the plunger #10 enters the depression or hole #11 and the truck body is locked to the chassis.

To release the truck body, the key #8 is pushed into place and the winged head #7 is turned to the left until the lever #1 is in the released position as shown in Fig. 4, the truck body can then be pulled back and removed.

What I claim is:

1. In combination with the usual means adapted to wedge a body to an automobile chassis when said body is moved horizontally, of a lever pivotally mounted on the chassis which is adapted to engage the body to move it horizontally and means for holding said lever in a predetermined position until released by a key.

2. In combination with the usual means to wedge a body to an automobile chassis when said body is moved horizontally, of a lever pivotally mounted on the chassis adapted to move the body horizontally, a screw member adapted to control the movement of the lever and means for turning the screw member to move the body.

3. In combination with the usual means adapted to wedge a body to an automobile chassis when the body is moved horizontally, of a lever pivotally mounted upon the chassis adapted to move the body horizontally, a screw member arranged to control the movement of the lever, a plunger adapted to enter a depression or hole in the screw member to hold all parts in locked position until released by a key.

WILLIS E. HARMON.

Witnesses:
 JAMES W. BURKE,
 WALTER W. FISKE.